United States Patent
Yagi et al.

(10) Patent No.: US 6,644,840 B2
(45) Date of Patent: Nov. 11, 2003

(54) INFRARED IRRADIATION LAMP FOR AUTOMOBILE

(75) Inventors: Seiichiro Yagi, Shizuoka (JP); Takashi Inoue, Shizuoka (JP); Takashi Hori, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/127,751

(22) Filed: Apr. 23, 2002

(65) Prior Publication Data

US 2002/0154515 A1 Oct. 24, 2002

(30) Foreign Application Priority Data

Apr. 24, 2001 (JP) ........................................ 2001-126513

(51) Int. Cl.[7] ................................................. F21V 11/00
(52) U.S. Cl. ........................ 362/510; 362/539; 362/293
(58) Field of Search ................................ 362/539, 510, 362/293

(56) References Cited

U.S. PATENT DOCUMENTS

2001/0019482 A1 * 9/2001 Kobayashi et al. ......... 362/510

FOREIGN PATENT DOCUMENTS

JP 2001-229717 8/2001

* cited by examiner

*Primary Examiner*—Sandra O'Shea
*Assistant Examiner*—Guiyoung Lee
(74) *Attorney, Agent, or Firm*—Sughrue Mion, PLLC

(57) ABSTRACT

An infrared light irradiation lamp comprises a lighting chamber S formed by a lamp body 12 and a front lens 14, a reflector 16 provided in the lamp body 12, a light source 20 provided ahead of the reflector 16 in the lighting chamber S, and a cylindrical globe 30 for infrared light formation which is provided to cover the light source 20 and serves to shield a visible light and to transmit only an infrared light, wherein diffusion steps 17 and 15 are provided in a peripheral region 16a of the light source in the reflector 16 and/or a region 14a in the front lens 14 corresponding to the peripheral region 16a of the light source in the reflector. Thus, a red light component L2 of a visible light transmitted through the globe 30 and guided to the peripheral region 16a of the light source in the reflector is diffused and reflected (L21, L22) or is diffused and emitted through the region 14a of the central part of the front lens so that the luminous flux density of the red light component distributed forward is reduced to dilute a red light emitted from the lamp.

5 Claims, 13 Drawing Sheets

FIG. 2(a)
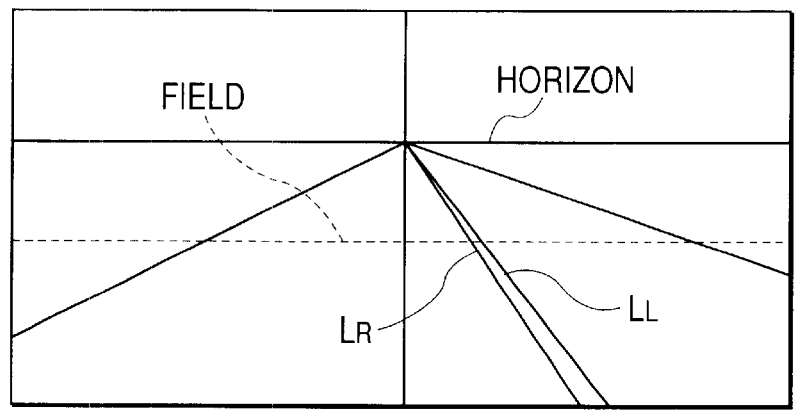
TYPICAL VIEW OF IMAGE OF RUNNING SCENE
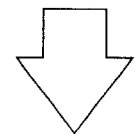
FIG. 2(b)
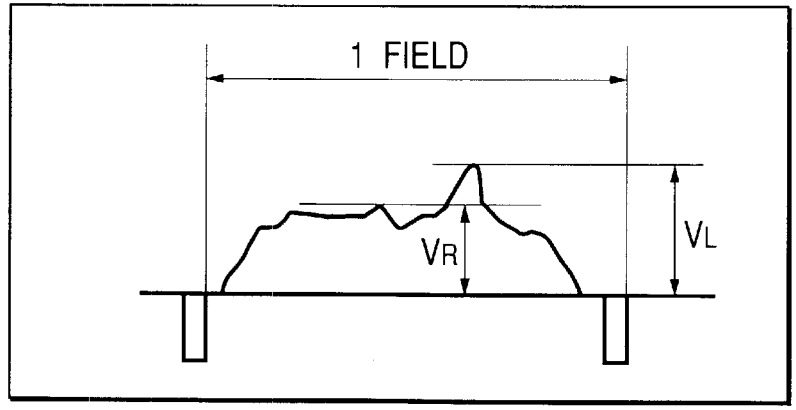
VIDEO OUTPUT SIGNAL

INFRARED IRRADIATION LAMP FOR AUTOMOBILE

BACKGROUND OF THE INVENTION

1. Field of the Invention

The present invention relates to an infrared irradiation lamp for an automobile which is mounted on an automobile and illuminates a forward portion of a vehicle with an infrared light, and more particularly to an infrared irradiation lamp for an automobile which is to be shared with a CCD camera having a sensitivity up to a near-infrared.

2. Description of the Related Art

For example, this kind of lamp has such a structure that a visible light source and a reflector are provided in a lamp housing formed by a lamp body and a front lens, an infrared transmission globe having a surface coated with an infrared transmission multilayer film is provided to cover the visible light source, and an infrared light in a light of a light source which is transmitted through a globe is reflected by the reflector, is transmitted through the front lens and is distributed forwardly.

An image of infrared light irradiation region in a forward portion of a vehicle is captured by a CCD camera having a sensitivity up to a near-infrared which is provided in a front part of an automobile, is processed by an image processing apparatus and is projected onto a monitor screen in a vehicle compartment. A driver can confirm a person, a lane mark and an obstacle over the monitor screen projecting a field of view in the forward part of the vehicle at a great distance.

In the conventional infrared irradiation lamp, however, an infrared light transmission multilayer film cannot completely cut a visible light at the long-wavelength side of approximately 700 to 800 nm. Therefore, the lamp looks to be turned on. For this reason, there is a possibility such that the infrared irradiation lamp provided in the front part of an automobile might be erroneously recognized as a tail lamp or a stop lamp. Therefore, there is a problem in respect of its safety.

SUMMARY OF THE INVENTION

The inventor made investigations, and as a result, the red light component of the visible light which cannot completely be cut by the infrared light transmission globe (the visible light transmitted through the infrared light transmission globe) is guided to the whole reflector and a light reflected in a peripheral region of a light source in the reflector and emitted from the vicinity of the central part of a front lens has the highest energy (luminous flux density). Therefore, it has been confirmed that the vicinity of the central part of the front lens (the peripheral region of the light source in the reflector) is seen to emit a red light to be ring-shaped.

Therefore, the inventor supposed that the red light component of the visible light to be the cause of the lamp to be seen red is preferably diluted. Consequently, a diffusion step for diffusing a light is provided in the peripheral region of the light source in the reflector and in the vicinity of the central part of the front lens. Consequently, it has been confirmed that the diffusion step is effective for reducing a tone of color for the red light emission of the lamp. Thus, the invention has been proposed.

The invention has been made in consideration of the problems in the prior art and has an object to provide an infrared irradiation lamp in which the red light component of a visible light to be the cause for the lamp seen to emit a red light is diluted and is emitted from a front lens so that the lamp can be prevented from being erroneously recognized as a tail lamp or a stop lamp.

In order to achieve the object, a first aspect of the invention is directed to an infrared irradiation lamp for an automobile comprising a lamp housing formed by a lamp body and a front lens, a reflector provided in the lamp body, a light source provided ahead of the reflector in the lamp housing, and a cylindrical globe for infrared light formation which is provided to cover the light source and serves to shield a visible light and to transmit only an infrared light, wherein a diffusion step is provided on a part of the reflector with being in a peripheral region of the light source, and/or a region on another part of the front lens with being corresponding to the peripheral region of the light source.

For first means, the diffusion step for diffusing and reflecting the red light component of the visible light transmitted and guided through the globe for infrared light formation is provided in the peripheral region of the light source of the reflector. For second means, the diffusion step for diffusing and transmitting the red light component of the visible light transmitted through the globe for infrared light formation and reflected and guided by the peripheral region of the light source in the reflector is provided in the region of the front lens corresponding to the peripheral region of the light source in the reflector. For third means, the diffusion step for diffusing and reflecting the red light component of the visible light transmitted and guided through the globe for infrared light formation is provided in the peripheral region of the light source in the reflector, and the diffusion step for diffusing and transmitting the red light component of the visible light diffused, reflected and guided by the peripheral region of the light source in the reflector is provided in the region of the front lens corresponding to the peripheral region of the light source in the reflector.

The diffusion steps to be provided in the reflector and the front lens include a fish-eye step and a cylindrical step.

The light distribution of the lamp includes the case in which a step for light distribution control is not provided on the front lens but the light is controlled and formed by only the reflector in addition to the case in which the light reflected by the reflector is controlled and formed at the step for light distribution control provided on the front lens. It is assumed that the front lens also includes the front lens having no step for light distribution control, that is, a so-called front cover.

As to the function performed by the first aspect of this invention, the red light component of the visible light which cannot completely be cut by the globe for infrared light formation (the visible light transmitted through the globe for infrared light formation) is reflected by the whole reflector and is emitted from the front lens. A light reflected by the peripheral region of the light source in the reflector and emitted from the vicinity of the central part of the front lens corresponding to the peripheral region of the light source has the highest energy (luminous flux density). For this reason, conventionally, the vicinity of the central part of the front lens (the region corresponding to the peripheral region of the light source in the reflector) is seen to emit a light like a red ring. In the invention, the red light component of the visible light transmitted through the globe for infrared light formation and guided to the peripheral region of the light source in the reflector is diffused by the diffusion step when it is to be reflected here (the peripheral region of the light source in the reflector), or the red light component is diffused by the diffusion step when it is to be reflected by the reflector and is to be then transmitted (emitted) through the front lens. Consequently, the luminous flux density of the red light component distributed forward from the vicinity of the central part of the front lens is reduced so that the red light emitted from the lamp is diluted.

Furthermore, the red light component of the visible light transmitted through the globe for infrared light formation and guided to the peripheral region of the light source in the reflector is diffused by the diffusion step when it is to be reflected by the reflector, and furthermore, is diffused by the diffusion step also when it is to be transmitted (emitted) through the front lens. More specifically, the red light component of the visible light reflected and diffused by the reflector is further diffused when it is to be transmitted through the front lens. Consequently, the luminous flux density of the red light component distributed forward from the vicinity of the central part of the front lens is more reduced than that in the case in which the diffusion step is provided in the reflector or the front lens so that the red light emitted from the lamp is diluted still more.

A second aspect of the invention is directed to the infrared irradiation lamp according to the first aspect of the invention, wherein the globe for infrared light formation has a rear end thereof provided apart from the reflector, and a light of the light source is directly guided from a clearance provided between the reflector and the rear end of the globe for infrared light formation to the peripheral region of the light source in the reflector.

As to the function performed by the second aspect of this invention, the light of the light source is directly guided to the inside of the peripheral region of the light source in the reflector and the light (white light) of the light source thus reflected is also emitted from the vicinity of the central part of the front lens corresponding to the peripheral region of the light source. Consequently, the luminous flux density of the red light component distributed forward from the vicinity of the central part of the front lens is further reduced.

A third aspect of the invention is directed to the infrared irradiation lamp according to the first or second aspect of the invention, wherein a shielding shade for shielding the light of the light source emitted from an opening on a front end side of the globe is provided ahead of the globe for infrared light formation, and a reflecting surface for reflecting the light of the light source and for guiding the reflected light to the peripheral region of the light source in the reflector is provided on a back side of the shielding shade.

As to the function performed by the third aspect of this invention, the shielding shade shields the light of the light source which is emitted from the opening on the front end side of the globe for infrared light formation, thereby impeding the generation of a glare light. Moreover, the light (white light) of the light source reflected by the reflecting surface on the back side of the shielding shade is reflected in the peripheral region of the light source in the reflector and is emitted as a diffused light from the vicinity of the central part of the front lens so that the luminous flux density of the red light component diffused and distributed from the vicinity of the central part of the front lens is further reduced.

BRIEF DESCRIPTION OF THE DRAWINGS

FIG. 2(a) is a typical diagram showing an image in a forward part of a vehicle, FIG. 2(b) is a diagram showing a picture output signal fetched in an image processing analyzer.

DESCRIPTION OF THE PREFERRED EMBODIMENTS

Next, embodiments of the invention will be described based on the following examples.

Figure 1:
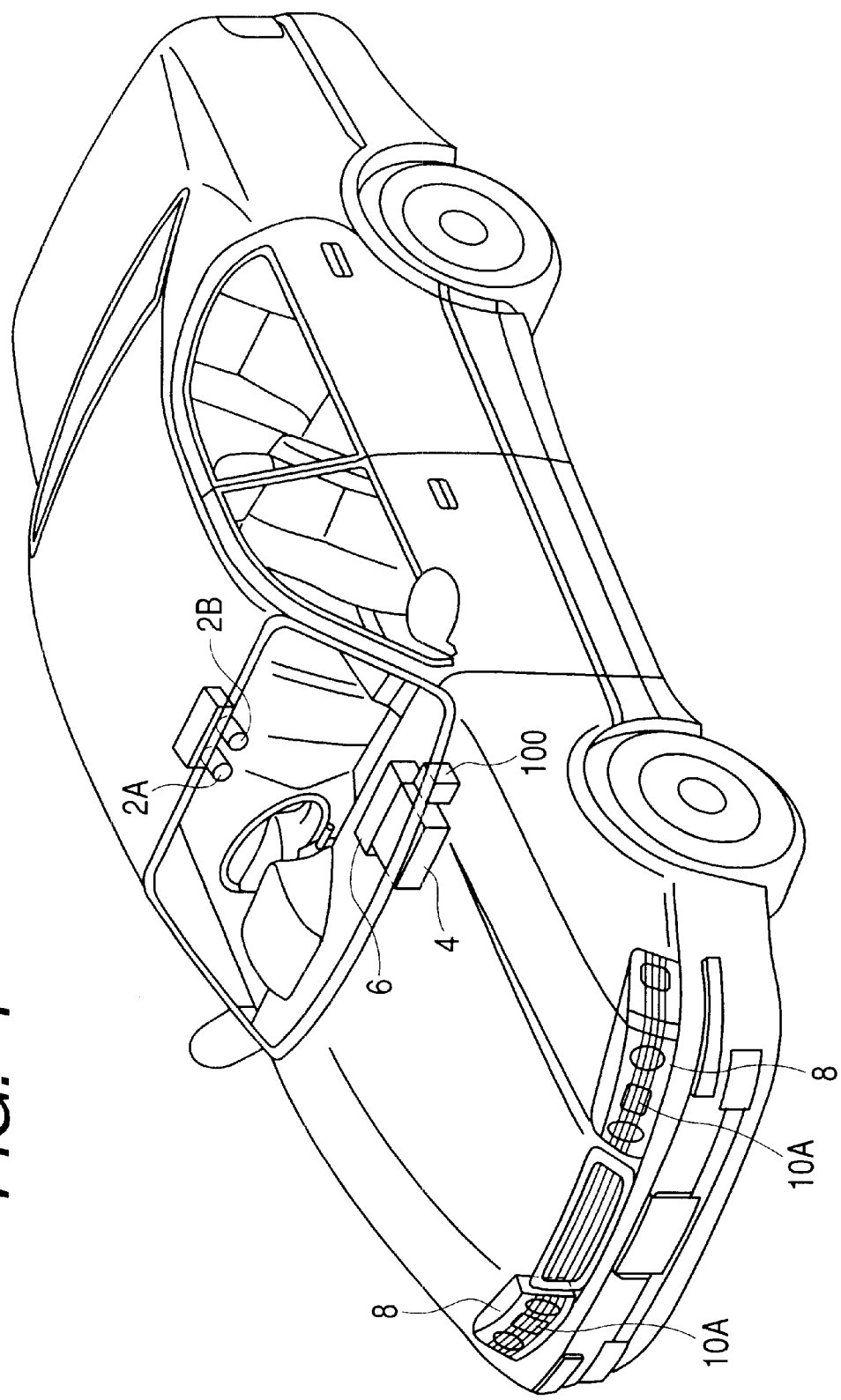
FIG. 1 is a view showing the whole structure of a night forward field-of-view detecting system using an infrared irradiation lamp according to a first embodiment of the invention.
Figure 3:
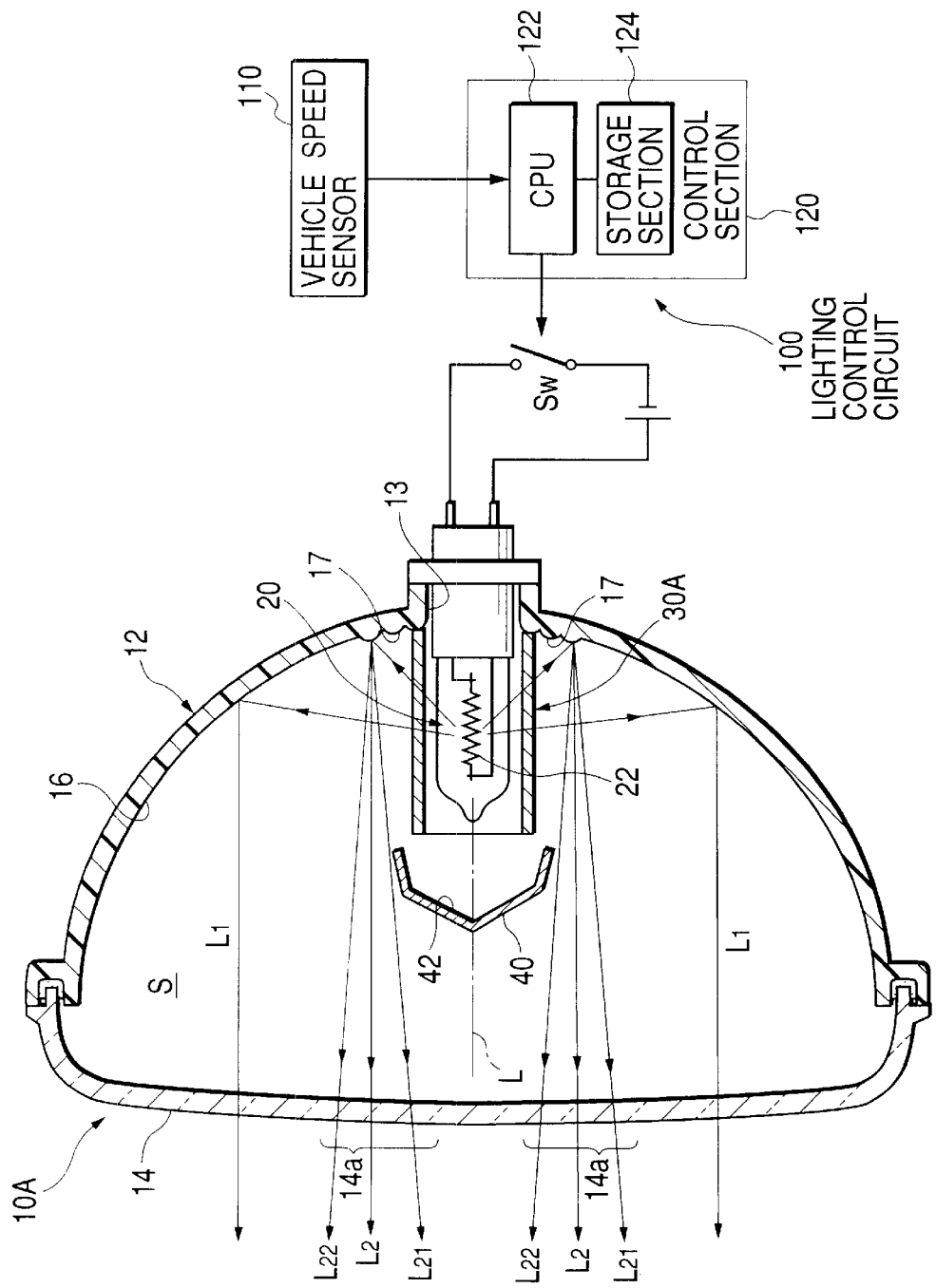
FIG. 3 is a longitudinal sectional view showing the infrared irradiation lamp according to the first embodiment of the invention.
Figure 4A:
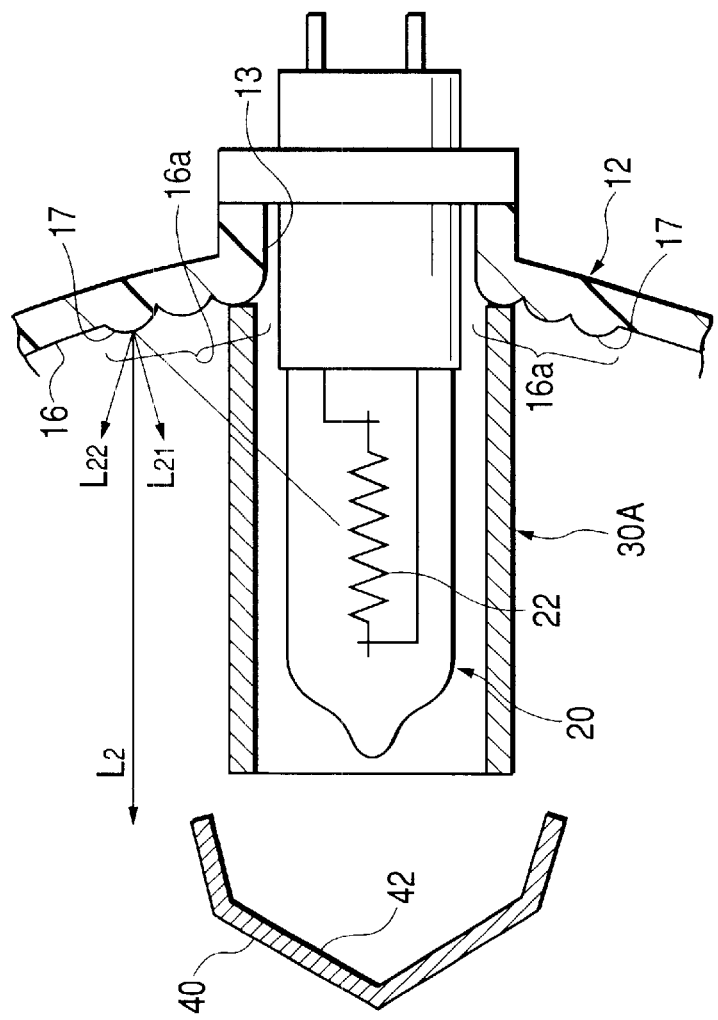
FIG. 4(a) is an enlarged longitudinal sectional view showing a peripheral region of a bulb to be the main part of the infrared irradiation lamp.
Figure 4B:
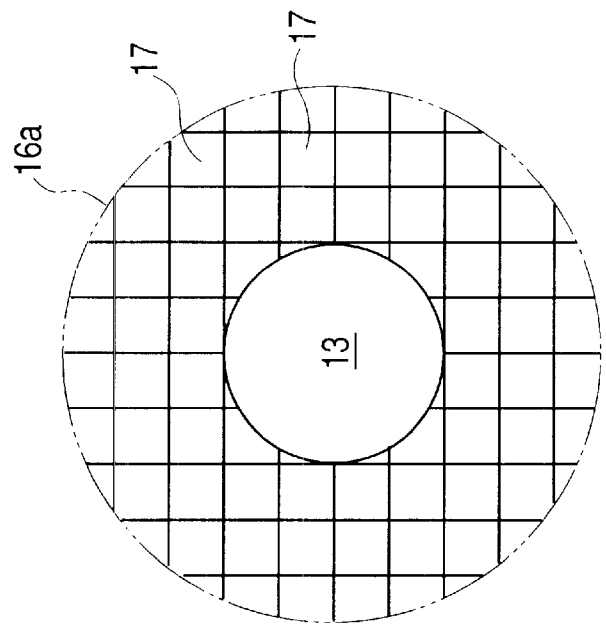
FIG. 4(b) is a front view showing a peripheral region of a bulb insertion attachment hole in a reflector.
Figure 5:
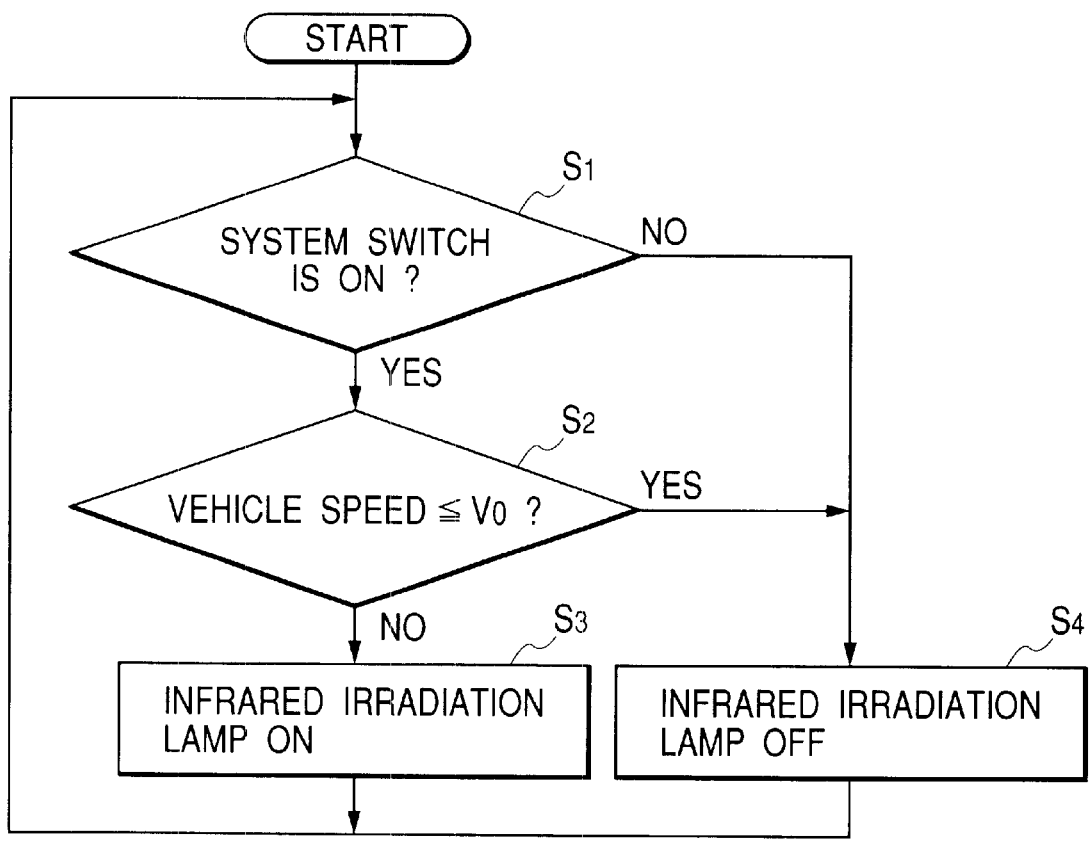
FIG. 5 is a flow chart showing a processing flow of a CPU in a control portion for controlling the light-up of the infrared irradiation lamp.

FIGS. 1 to 5 show an example in which the invention is applied to a night forward field-of-view detecting system, and FIG. 1 is a view showing the whole structure of a night forward field-of-view detecting system using an infrared irradiation lamp according to a first embodiment of the invention, FIG. 2(a) is a typical diagram showing an image in a forward part of a vehicle which appears on a display, FIG. 2(b) is a diagram showing a picture output signal fetched in an image processing analyzer, FIG. 3 is a longitudinal sectional view showing the infrared irradiation lamp, FIG. 4(a) is an enlarged longitudinal sectional view showing a peripheral region of a bulb to be the main part of the infrared irradiation lamp, FIG. 4(b) is a front view showing a peripheral region of a bulb insertion attachment hole in a reflector and FIG. 5 is a flow chart showing a processing flow of a CPU in a control portion for controlling the light-up of the infrared irradiation lamp.

As shown in FIG. 1, the night forward field-of-view detecting system is mainly constituted by a headlamp 8 and an infrared irradiation lamp 10A which are provided in the front part of a vehicle, a pair of CCD cameras 2A and 2B provided side by side on the upper part in a vehicle compartment and serving to photograph a field of view in the forward portion of the vehicle, an image processing analyzer 4 for analyzing images captured by the CCD cameras 2A and 2B, and a head up display (HUD) 6 for displaying data analyzed by the image processing analyzer 4.

The CCD camera for photographing the forward region of the vehicle is constituted by the visible light CCD camera 2A having a sensitivity in a visible light area and the infrared light CCD camera 2B having a sensitivity up to an infrared light area, and is of a stereo camera type capable of measuring a distance to a forward view object. The images captured by both of the CCD cameras 2A and 2B are transferred to the image processing analyzer 4 and two pictures are compared with each other.

More specifically, a picture output voltage of each scanning line (field) is fetched from a picture (image) shown in FIG. 2(a) which is captured by the CCD camera and is stored as data on a whole screen (or a main part) in consideration of γ characteristics (photoelectric conversion characteristics) of both cameras 2A and 2B. The correction is required for adjusting the sensitivities of the cameras 2A and 2B to obtain almost the same picture outputs in the cameras 2A and 2B for an object on the road. By taking a difference between the two images and fetching the difference which is equal to or greater than a certain threshold from the pictures, it is possible to obtain pictures of a pedestrian, an obstacle and a lane mark at a great distance which cannot be seen. By carrying out an edge processing or pattern recognition based on the picture for the difference, it is possible to easily recognize the pedestrian, the obstacle and the lane mark.

The pictures of the pedestrian, the obstacle and the lane mark can be given to a driver through the head up display (HUD) 6 and the features of an object on the road (the pedestrian, the obstacle and the lane mark) can be decided by shape recognition and can be reported to the driver in a voice.

The CCD camera for photographing the forward region of the vehicle may be constituted by one CCD camera having a sensitivity in a near-infrared light area and an infrared light area in place of the two CCD cameras including the visible light compatible CCD camera 2A and the infrared light compatible CCD camera 2B.

As shown in FIG. 3, moreover, the infrared irradiation lamp 10A is mainly constituted by a vessel-shaped lamp body 12, a front lens 14 assembled into the opening on the front surface of the lamp body 12 and forming a lamp housing S in cooperation with the lamp body 12, a parabolic reflector 16 formed integrally with the inner peripheral surface of the lamp body 12, a halogen bulb 20 to be a light source inserted and attached into a bulb insertion attachment hole 13 provided in the rear top portion of the lamp body 12, and a globe 30A for infrared light formation which is provided to surround the bulb 20.

The globe 30A for infrared light formation is provided cylindrically to entirely cover the bulb 20 and an infrared light transmission multilayer film for shielding a visible light and transmitting only an infrared light is provided in the whole area of the outer peripheral surface of a cylindrical globe body formed of glass. Accordingly, when the bulb 20 is turned on, lights L1 and L2 emitted from a filament 22 toward the reflector 16 are transmitted through the globe 30A, and the visible light is shielded by (the infrared light transmission multilayer film of) the globe 30A and only the infrared light can be transmitted through (the infrared light transmission multilayer film of) the globe 30A. Consequently, the infrared light guided to the reflector 16 is reflected as shown in the arrows L1 and L2 of FIG. 3, is transmitted through the front lens 14 and is distributed forward as a light which is almost parallel with an optical axis L of the lamp.

Moreover, a fish-eye step 17 to be a diffusion step is provided to surround the bulb insertion attachment hole 13 in a peripheral region 16a of the light source in the reflector 16 which is ring-shaped as seen from a front as shown in FIGS. 4(a) and (b), and a red light component transmitted through the globe 30A for infrared light formation and guided to the peripheral region 16a of the light source in the reflector 16 is diffused and reflected by the fish-eye step 17 as shown in an arrow of FIG. 4(a). The arrow L2 in FIG. 3 indicates the direction of the red light component diffused and reflected by the peripheral region 16a of the light source in the reflector 16 (the fish-eye step 17) and the diffusion and the reflection are carried out within a range from an arrow L21 to an arrow L22.

More specifically, the red light component of the visible light which cannot completely be cut by the globe 30A for infrared light formation (the visible light transmitted through the globe 30A for infrared light formation) is reflected by the whole reflector 16 and is emitted from the front lens 14. A light reflected by the peripheral region 16a of the light source in the reflector 16 and emitted from a vicinity 14a of the central part of the front lens (a ring-shaped region seen from a front) corresponding to the peripheral region 16a of the light source has the highest energy (luminous flux density). For this reason, conventionally, the vicinity 14a of the central part of the front lens (the region corresponding to the peripheral region 16a of the light source in the reflector 16) emits a light as seen like a red ring. In the embodiment, however, when the red light component of the visible light transmitted through the globe 30A for infrared light formation and guided to the peripheral region 16a of the light source in the reflector 16 is to be reflected by (the peripheral region 16a of the light source in) the reflector 16, it is diffused and reflected by the fish-eye step 17 as shown in the reference numerals L21 and L22 and is transmitted (emitted) as a diffused light through the front lens 14. For this reason, the luminous flux density of the red light component distributed forward from the region 14a of the central part of the front lens 14 is decreased so that the degree of red light emission of the lamp is reduced.

Thus, the red light component L2 (L21, L22) of the visible light distributed from the vicinity of the central part of the front lens 14 has a luminous flux density reduced as the diffused light. Therefore, the lamp is not seen to emit a red light.

Moreover, a shielding shade 40 for shielding the light of the light source emitted forward through the opening on the front end of the globe 30A to block the generation of a glare light is provided ahead of the globe 30A. More specifically, the shielding shade 40 has the back side thereof subjected to a darkening process 42 in which a light can be absorbed easily and is formed to be slightly larger than the bore of the globe 30A, and the direct light (white light) of the bulb 20 can be prevented from breaking through the opening on the front end of the globe 30A as much as possible.

The shielding shade 40 is integrated with the reflector 16 with a leg thereof (not shown) fixed to the reflector 16. Moreover, the globe 30A is fixed around the bulb insertion attachment hole 13 of the reflector 16 through bonding or a holder (not shown).

Moreover, there is a possibility such that the infrared light might injure eyes of a person if it enters the eyes for a long period of time. By a lighting control circuit 100 (see FIG. 3) comprising a vehicle speed sensor 110 and a control portion 120 having a CPU 122 and a storage portion 124 in the lamp 10A, therefore, the bulb 20 is turned on during only a running operation in which the infrared light does not injure the eyes, and the bulb 20 is automatically put out at a predetermined speed V0 or less at which a vehicle speed V approximates to zero at time of stoppage in which the infrared light might injure the eyes.

More specifically, a vehicle speed condition for outputting a stop signal to stop the light-up of the bulb 20 (lamp 10A) is previously input and set to the storage portion 124 of the control portion 120. When the CPU 122 decides that the vehicle speed V is set to be the predetermined speed V0 or less which approximates to zero in response to an output sent from the vehicle speed sensor 110, it outputs a stop signal for turning OFF a bulb light-up switch Sw. Consequently, the bulb light-up switch Sw is turned OFF so that the supply of a current to the bulb 20 is stopped and the bulb 20 (lamp 10A) is thereby put out.

FIG. 5 shows a processing flow of the control portion 120 (CPU 122) of the lighting control circuit 100. This routine is started on the premise that a headlamp 8 (a low beam or a main beam) is set in a light-up state.

At a step S1, first of all, it is decided whether or not a switch for operating a night forward field-of-view detecting system is turned ON. In the case in which a driver drives while watching an image on the head up display 6, the system operating switch is pressed as a manual switch and may be turned ON interlockingly with the light-up of the low beam of the headlamp.

If the decision is YES (the night forward field-of-view detecting system operating switch is ON) at the step S1, it is decided whether or not a vehicle speed V is equal to or smaller than a predetermined value (V0) which approximates to zero based on the output of the vehicle speed sensor 110. It the decision is NO (V>V0) at the step S2, the process proceeds to a step S3 in which an output is sent to light up the bulb 20 (the infrared irradiation lamp 10A) and the process then returns to the step S1. On the other hand, if the decision is NO (the night forward field-of-view detecting system operating switch is not turned ON) at the step S1 or the decision is YES (V≦V0) at the step S2, an output is sent to put out the lighted bulb 20 (infrared irradiation lamp 10A) at a step S4 and the process then returns to the step S1.

Figure 6:
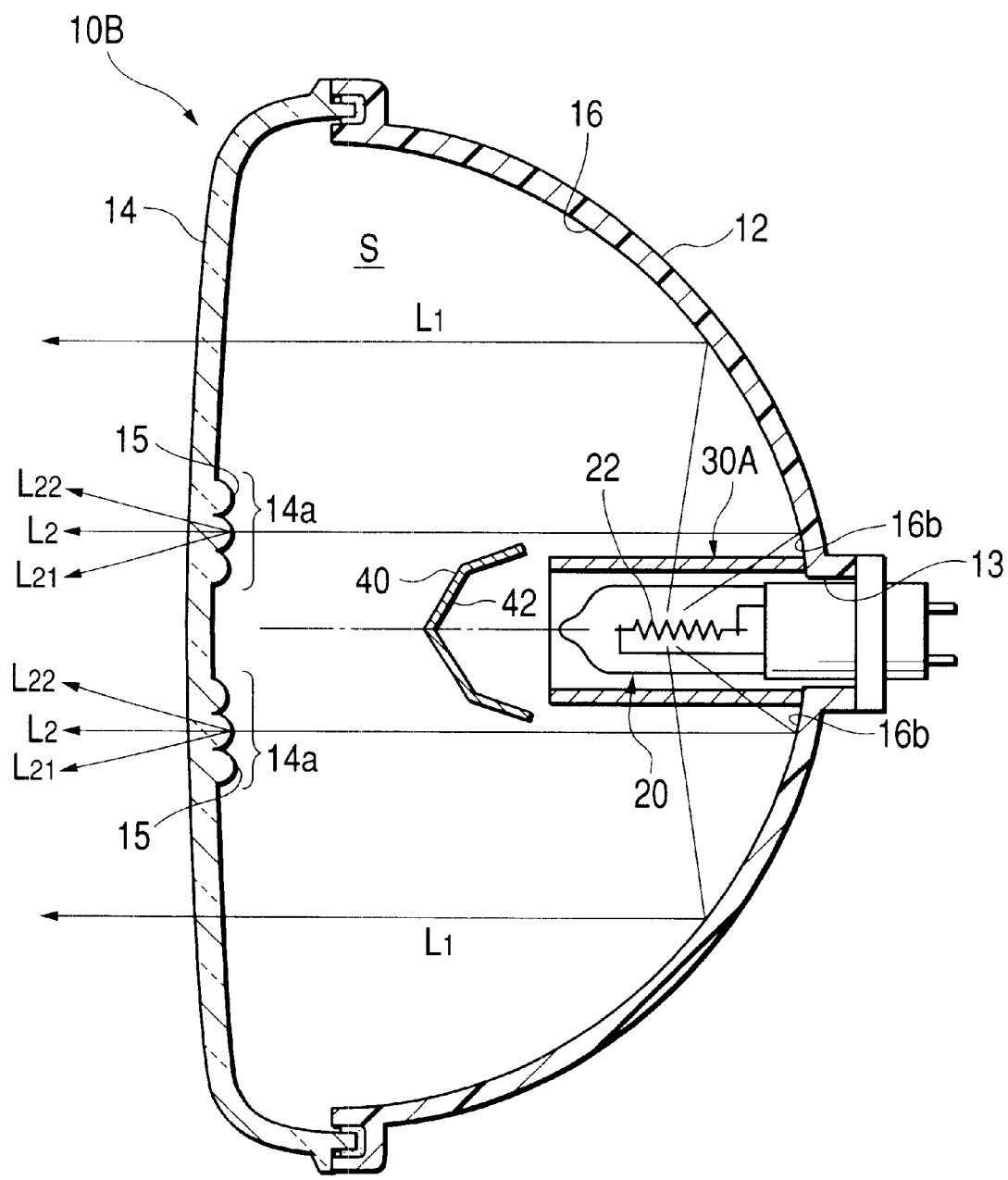
FIG. 6 is a longitudinal sectional view showing an infrared irradiation lamp according to a second embodiment of the invention.

FIG. 6 is a longitudinal sectional view showing an infrared irradiation lamp according to a second embodiment of the invention.

While the red light component of the visible light is diffused by the fish-eye step 17 provided in the peripheral region 16a of the light source in the reflector 16 in the first embodiment, a fish-eye step 15 for diffusing the red light component of the visible light is provided in a ring-shaped region 14a of the central part of a front lens 14 corresponding to the peripheral region 16a of the light source in a reflector 16 in an infrared irradiation lamp 10B according to the second embodiment.

More specifically, the red light component of the visible light which is reflected in a peripheral region 16b of the light source in the reflector 16 (a parabolic reflecting surface) as shown in the reference numeral L2 is diffused by the fish-eye step 15 as shown in arrows L21 and L22 during transmission (emission) through the front lens 14. Therefore, the luminous flux density of the red light component distributed forward from the front lens 14 is reduced so that the lamp is not seen to emit a red light.

Others are the same as those in the first embodiment and have the same reference numerals, and repetitive description thereof will be thereby omitted.

As described in the first embodiment, moreover, the fish-eye step 17 may be provided in the peripheral region 16a of the light source in the reflector 16 and the fish-eye step 15 may be provided in the ring-shaped region 14a of the front lens 14 corresponding to the peripheral region 16a of the light source in the reflector 16, which is not shown.

Thus, in the case in which the fish-eye steps 17 and 15 are provided in both of the reflector 16 and the front lens 14, the red light component of the visible light which is not cut by a globe 30A for infrared light formation but is guided to the peripheral region 16a of the light source in the reflector 16 is diffused by the diffusion step 17 when it is to be reflected by the reflector 16, and furthermore, is diffused by the diffusion step 15 when it is to be emitted from the front lens 14. More specifically, the red light component of the visible light which is diffused and reflected by the peripheral region 16a of the reflector 16 is further diffused when it is to be transmitted (emitted) through the region 14a of the central part of the front lens 14. Therefore, the luminous flux density of the red light component distributed forward from the front lens 14 is reduced still more so that the lamp is not seen to emit a red light at all.

Figure 7:
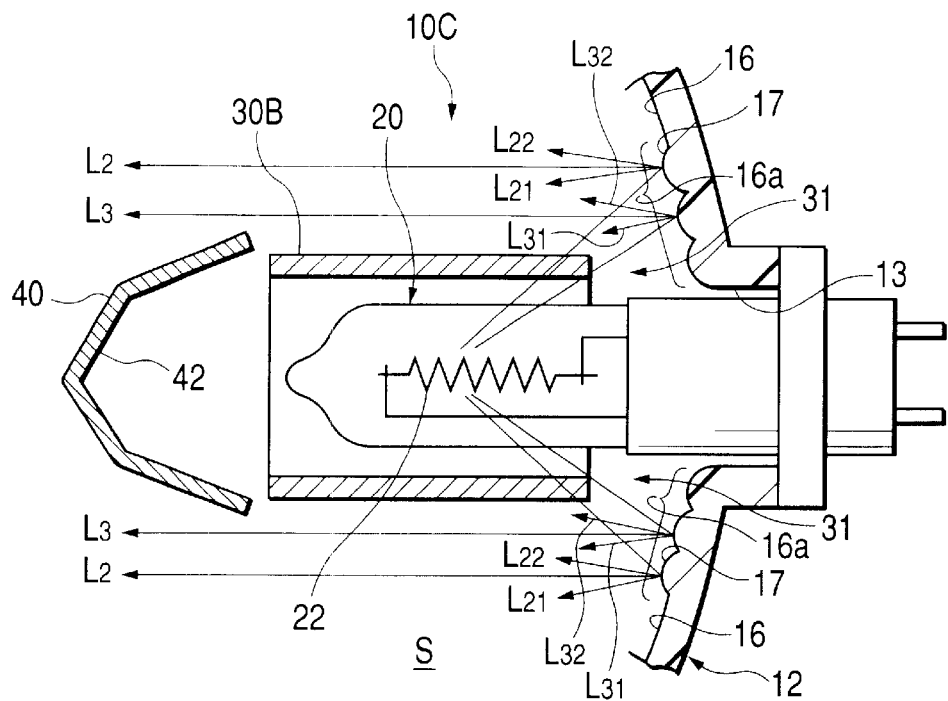
FIG. 7 is an enlarged longitudinal sectional view showing a peripheral region of a bulb to be the main part of an infrared irradiation lamp according to a third embodiment of the invention.

FIG. 7 is an enlarged longitudinal sectional view showing the peripheral region of a bulb to be the main part of an infrared irradiation lamp according to a third embodiment of the invention.

An infrared irradiation lamp 10C according to the third embodiment is characterized in that the length of a globe 30B for infrared light formation is smaller than that of the globe 30A used in the infrared irradiation lamp 10A according to the first embodiment and the rear end of the globe 30B is provided apart from the reflector 16 so that the light of the light source is directly guided from a clearance 31 provided between the reflector 16 and the rear end of the globe 30B toward the inside of a peripheral region 16a of the light source in the reflector 16. Others are the same as those in the first embodiment and have the same reference numerals, and repetitive description thereof will be thereby omitted.

While the red light component of the visible light transmitted through the globe 30B is diffused and reflected and is thus guided forward by a fish-eye step 17 of the peripheral region 16a of the light source in the reflector 16 as shown in the reference numeral L2 (L21, L22) in the embodiment, the light (white light) of the light source which is guided toward the inside of the peripheral region 16a of the light source in the reflector 16 and is not transmitted through the globe 30A is also diffused and reflected and is thus guided forward by the fish-eye step 17 as shown in the reference numeral L3 (L31, L32) so that both lights L2 and L3 are emitted from the vicinity of the central part of a front lens corresponding to the peripheral region 16a of the light source. For this reason, the luminous flux density of a red light component distributed forward from the vicinity of the central part of the front lens is more reduced than that in the case of the lamp 10A according to the first embodiment so that the lamp is not seen to emit a red light at all.

Figure 8:
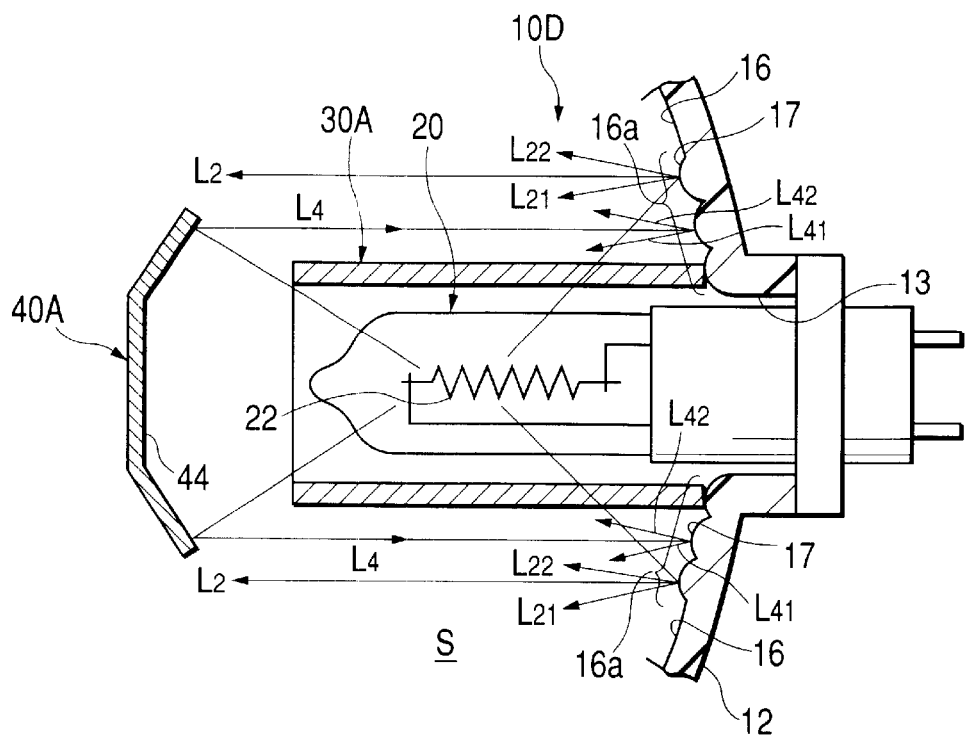
FIG. 8 is a longitudinal sectional view showing an infrared irradiation lamp according to a fourth embodiment of the invention.

FIG. 8 is an enlarged longitudinal sectional view showing the peripheral region of a bulb to be the main part of an infrared irradiation lamp according to a fourth embodiment of the invention.

In an infrared irradiation lamp 10D according to the fourth embodiment, a light of a light source emitted from the opening of the front end of a globe 30A is reflected by a reflecting surface 44 and is guided to a peripheral region 16a of the light source in a reflector by using a shielding shade 40A having a back face subjected to the reflecting surface 44 processing in place of the shielding shade 40 used for the infrared irradiation lamp 10A according to the first embodiment. Others are the same as those in the first embodiment and have the same reference numerals, and repetitive description thereof will be thereby omitted.

In the fourth embodiment, the light (white light) of the light source is guided through the shade 40A as shown in an arrow L4 to the peripheral region 16a of the light source in the reflector for diffusing and reflecting the infrared light component of a visible light transmitted through the globe 30A (see the reference numerals L21 and L22). Therefore, the diffused visible light components (white light components) L41 and L42 mixed with the diffused red light components L21 and L22 are emitted from the vicinity of the central part of a front lens 14. Accordingly, the luminous flux density of the red light component distributed forward from the vicinity of the central part of the front lens 14 is reduced still more so that the lamp is not seen to emit a red light.

Figure 9:
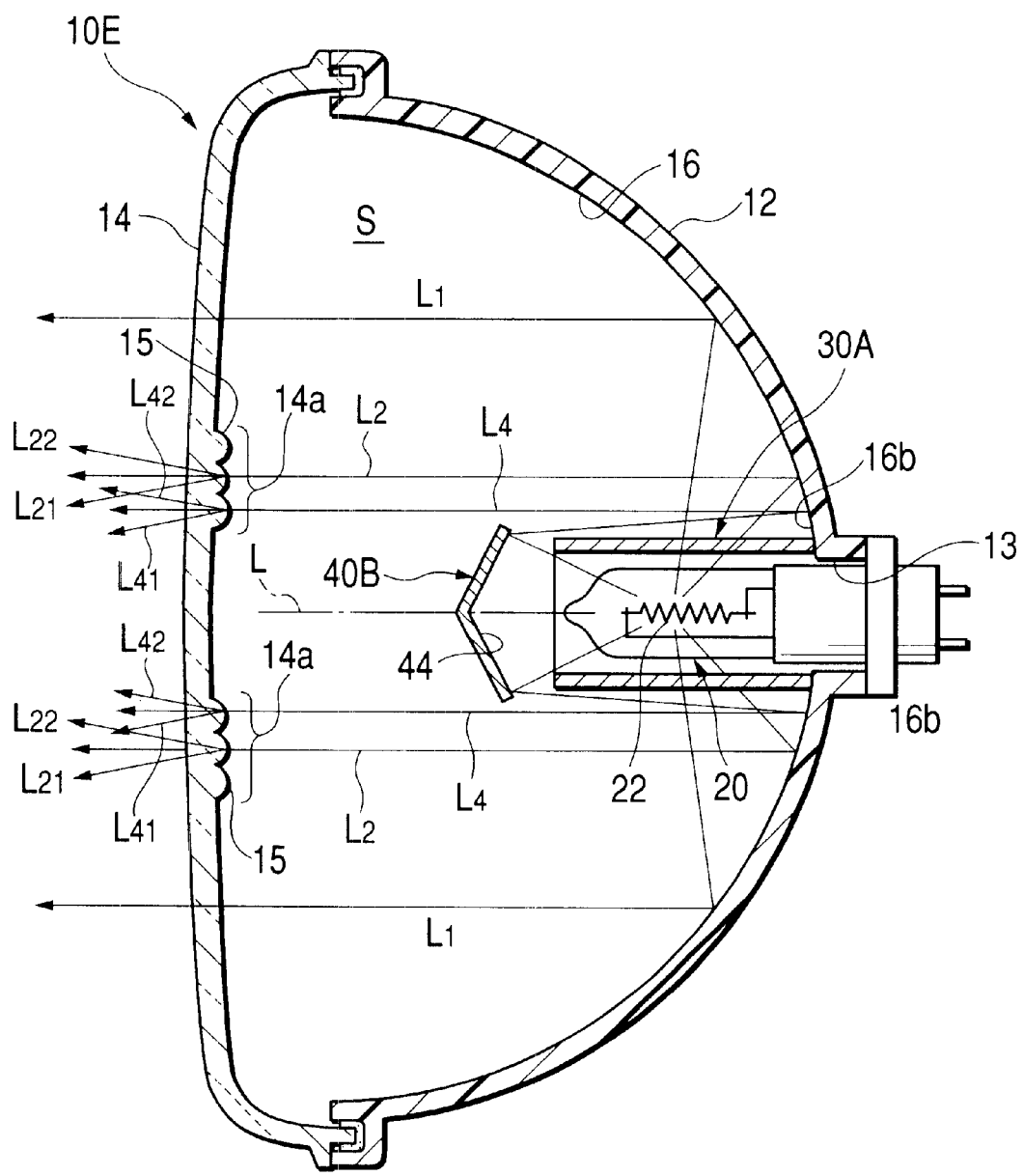
FIG. 9 is a longitudinal sectional view showing an infrared irradiation lamp according to a fifth embodiment of the invention.

FIG. 9 is an enlarged longitudinal sectional view showing an infrared irradiation lamp according to a fifth embodiment of the invention.

In an infrared irradiation lamp 10E according to the fifth embodiment, a light (white light) of a light source emitted from the opening of the front end of a globe 30A is reflected by a reflecting surface 44 and is guided to a peripheral region 16b of the light source in a reflector by using a shade 40B having a back face subjected to the reflecting surface 44 processing in place of the shade 40 used for the infrared irradiation lamp 10B according to the second embodiment. Others are the same as those in the second embodiment and have the same reference numerals, and repetitive description thereof will be thereby omitted.

In the fifth embodiment, a light (white light) L4 of a light source reflected by the shade 40B and reflected by the peripheral region (a parabolic reflecting surface) 16b of the light source in the reflector is also guided to a vicinity 14a of the central part of a front lens. Therefore, when a red light component and a white light component are to be emitted from the vicinity 14a of the central part of the front lens, they are diffused respectively as shown in arrows L2 (L21, L22) and L4 (L41, L42). Consequently, the luminous flux density of the red light component distributed forward from the vicinity 14a of the central part of the front lens is reduced so that the lamp is not seen to emit a red light.

Figure 10:
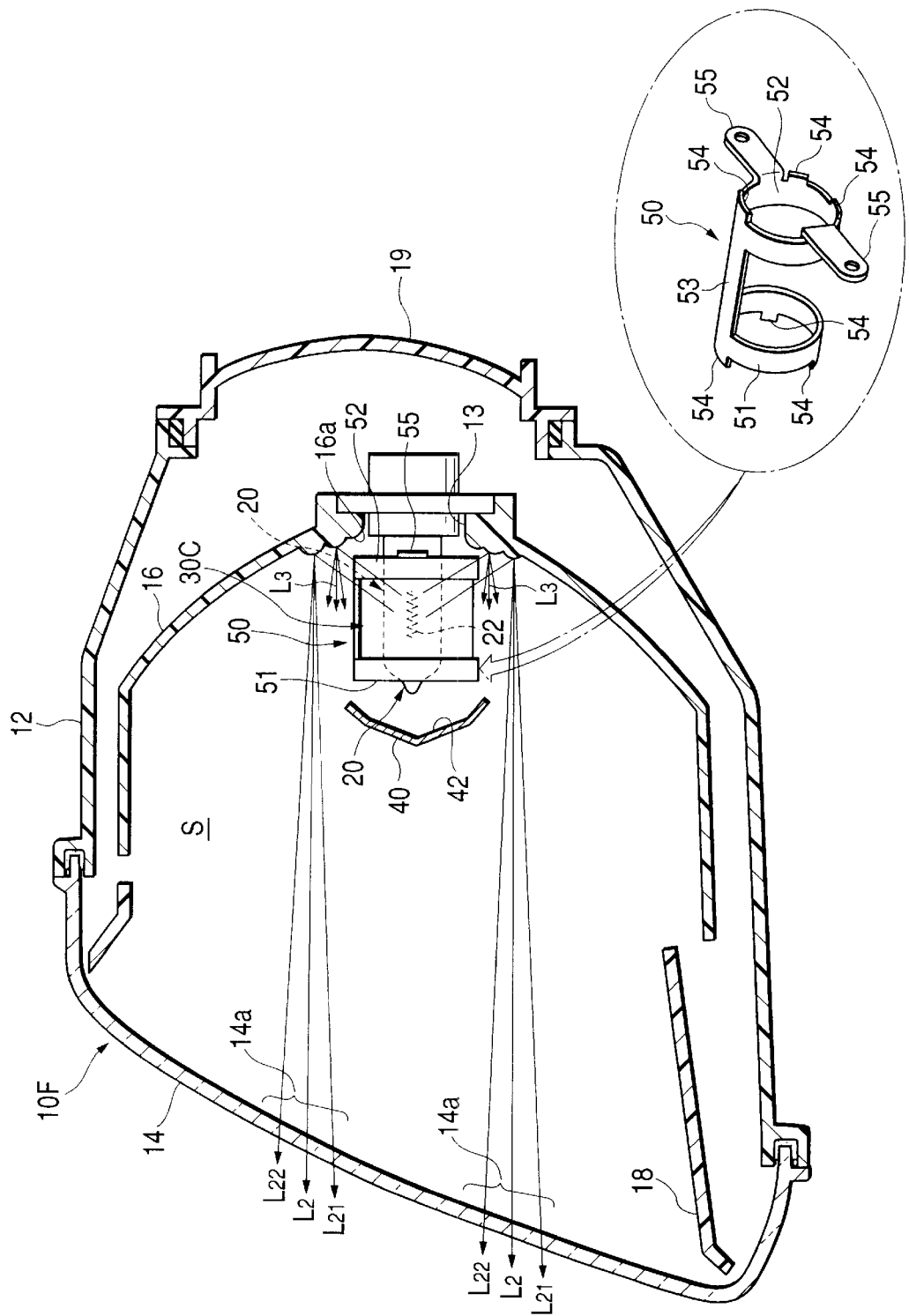
FIG. 10 is a longitudinal sectional view showing an infrared irradiation lamp according to a sixth embodiment of the invention.
Figure 11A:
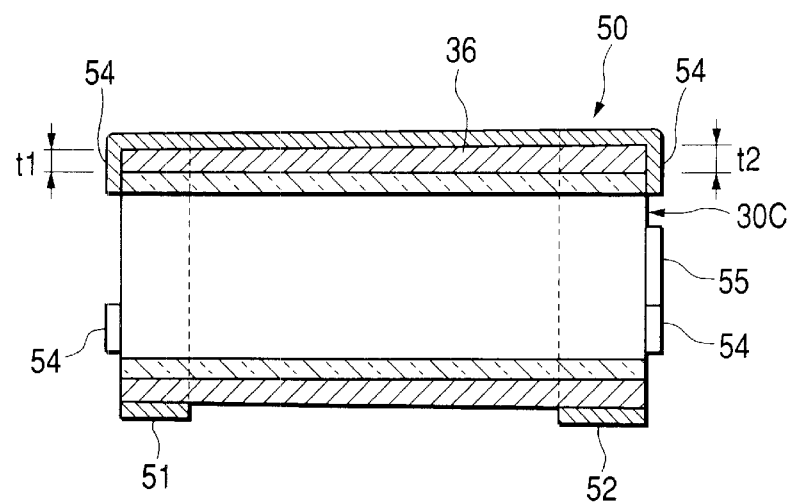
FIG. 11(a) is an enlarged longitudinal sectional view showing a globe for infrared light formation to be the main part of the same lamp.
Figure 11B:
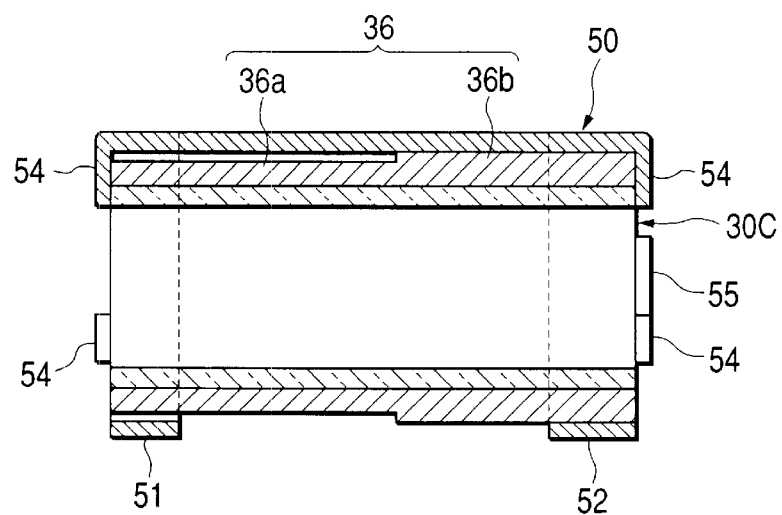
FIG. 11(b) is an enlarged longitudinal sectional view showing a variant of the globe for infrared light formation to be the main part of the same lamp.
Figure 11C:
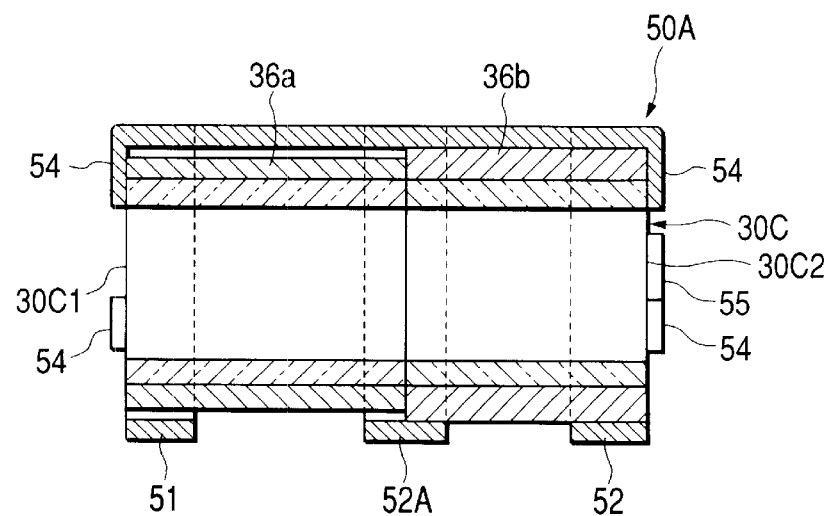
FIG. 11(c) is an enlarged longitudinal sectional view showing another variant of the globe for infrared light formation to be the main part of the same lamp.

FIGS. 10 and 11 show an infrared irradiation lamp according to a sixth embodiment of the invention, FIG. 10 being a longitudinal sectional view showing the infrared irradiation lamp and FIGS. 11(a) to (c) being enlarged longitudinal sectional views showing a globe for infrared light formation to be the main part of the same lamp, respectively.

While the reflector 16 is formed integrally with the inner peripheral surface of the lamp body 12 in all the infrared irradiation lamps 10A to 10E according to the first to fifth embodiments, the reflector 16 is supported tiltably with respect to the lamp body 12 by means of an aiming mechanism (not shown) in an infrared irradiation lamp 10F according to this embodiment.

A globe 30C for infrared light formation which covers a halogen bulb 20 is held by a metallic holder 50 fixed to the reflector 16. The holder 50 has such a structure that annular portions 51 and 52 capable of holding the front and rear ends of the globe 30C are integrated by a longitudinally extended straight portion 53, and a click 54 is provided in three equal circumferential parts of the annular portions 51 and 52, respectively. The globe 30C is inserted in the annular portions 51 and 52 to caulk the click 54 so that the globe 30C and the holder 50 are integrated with each other. The annular portion 52 is provided with a pair of left and right legs 55 extended orthogonally and the leg 55 is fixed to the reflector 16 with a screw so that the globe 30C is integrated with the reflector 16.

An infrared light transmission multilayer film 36 formed in the globe 30C is provided such that a thickness is gradually changed (t1<t2) in the longitudinal direction of the globe 30C (the thickness is increased toward the base of the bulb 20) as shown in FIG. 11(a), and a visible light cut ratio is gradually changed in the longitudinal direction (the visible light cut ratio is increased if the thickness of the infrared light transmission multilayer film 36 is increased). In the light transmitted through the globe 30C (the infrared light transmission multilayer film 36) toward a peripheral region 16a of a light source in the reflector 16, therefore, a visible light is cut in a large amount and the rate of an infrared light is high (the rate of an infrared light component in the visible light is small), and the light having a small rate of the infrared light component in the visible light is diffused and reflected by (a fish-eye step 17 of) the peripheral region 16a of the light source in the reflector 16 as shown in an arrow L2 (L21, L22) and is thus emitted from a region 14a of the central part of a front lens.

Moreover, a clearance is formed between the rear end of the globe 30C and the reflector 16, and a light (white light) of the light source is guided from the clearance to the peripheral region 16a of the light source in the reflector 16 and is then diffused and reflected by the fish-eye step 17 (see an arrow L3). For this reason, the luminous flux density of the infrared light component L2 (L21, L22) distributed forward from the region 14a of the central part of the front lens is very reduced. Consequently, the lamp is not seen to emit a red light.

The reference numeral 18 denotes an extension reflector, and the reference numeral 19 denotes a cover attached to an opening for bulb exchange in the rear top portion of the lamp body 12. Others are the same as those in the first and third embodiments (see FIGS. 6 and 7) and have the same reference numerals, and repetitive description thereof will be thereby omitted.

Moreover, the globe 30C for infrared light formation may have structures shown in FIGS. 11(b) and (c). More specifically, in FIG. 11(b), the infrared light transmission multilayer film 36 formed in the globe 30C is integrally constituted by two kinds of portions 36a and 36b having different thicknesses in a longitudinal direction. In FIG. 11(c), a globe portion 30C1 provided with the thin infrared light transmission multilayer film 36a and a globe portion 30C2 provided with the thick infrared light transmission multilayer film 36b are integrated by a holder 50A provided with an annular portion 52A for holding the abutment portion of both globe portions 30C1 and 30C2, thereby constituting the globe 30C.

FIGS. 11(b) and (c) typically show different thicknesses in order to make a difference in a thickness between the infrared light transmission multilayer films 36a and 36b. An actual infrared light transmission multilayer film is formed by evaporation. Therefore, the difference in the thickness between the infrared light transmission multilayer films 36a and 36b is too small to be seen.

Figure 12:
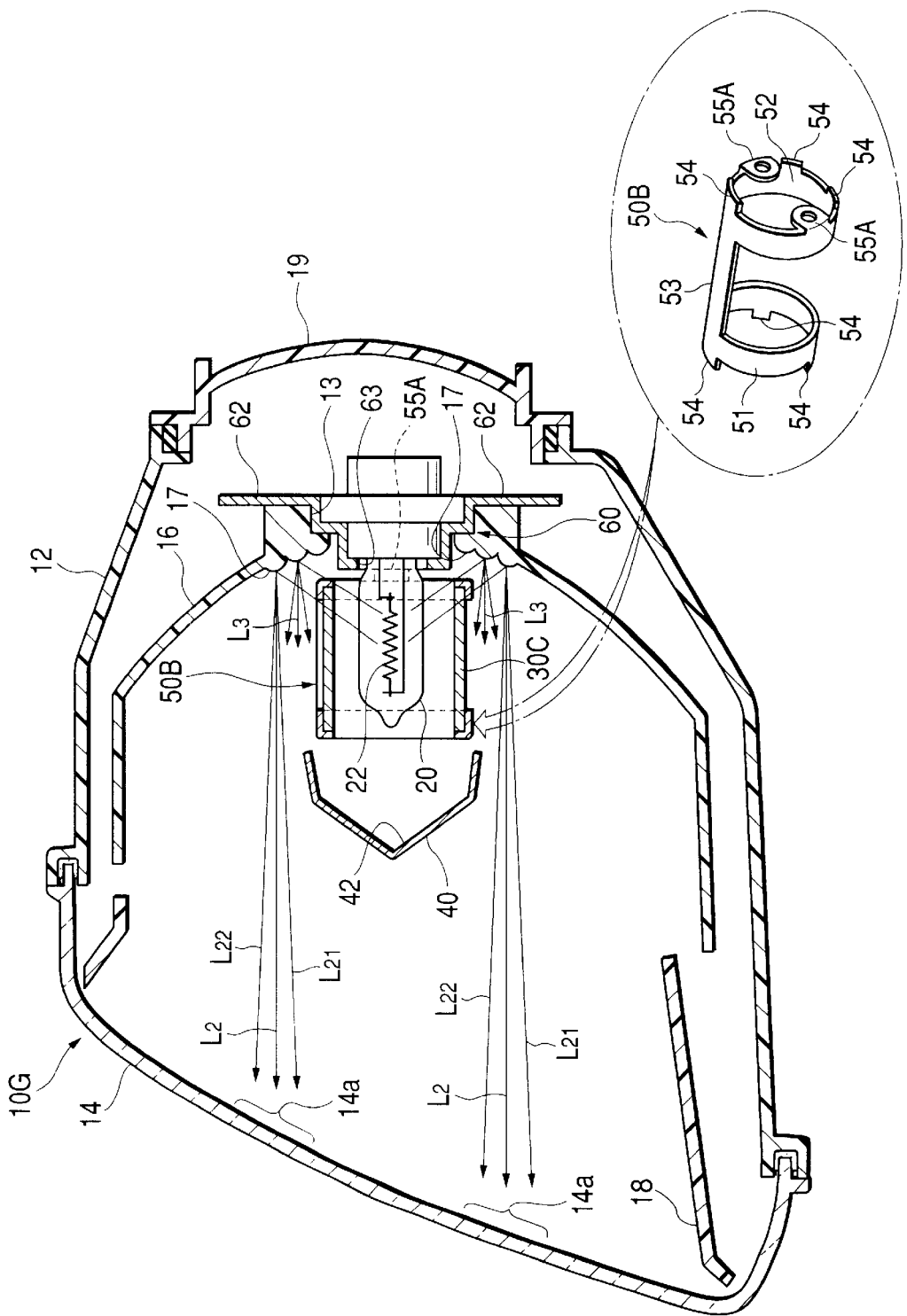
FIG. 12 is a partially enlarged longitudinal sectional view showing an infrared irradiation lamp according to a seventh embodiment of the invention.

FIG. 12 is a longitudinal sectional view showing an infrared irradiation lamp according to a seventh embodiment of the invention.

An infrared irradiation lamp 10G according to the embodiment has a reflector 16 supported tiltably with respect to a lamp body 12 by means of an aiming mechanism (not shown) in the same manner as the lamp 10F according to the sixth embodiment. Moreover, a light transmitted through a globe 30C and a light (white light) of a light source which are guided to a peripheral region 16a of a light source in the reflector 16 are diffused and reflected as shown in arrows L2 (L21, L22) and L3 (L31, L32) and are emitted from a region 14a of the central part of a front lens.

Furthermore, a second metallic holder 60 comprising a radiation fin 62 extended to the back of the reflector 16 is fixed integrally with a metallic holder 50B for fixing the globe 30 for infrared light formation to the reflector 16 so that the inside of the globe 30C can be prevented from being filled with heat.

More specifically, the second holder 60 is formed to have the shape of a stepped cylinder to be engaged with a bulb insertion attachment hole 13, and a pair of legs 55A extended toward the inside of the rear end of the holder 50B are fixed to a flange portion 63 formed on the front end of the second holder 60. The disc-shaped radiation fin 62 is formed in the second holder 60, and heat transferred to the globe 30C by turning on a bulb 20 is radiated from the radiation fin 62 to a space on the back of the reflector 16 through the holder 50B and the second holder 60. Consequently, it is possible to avoid various problems of an increase in the temperature of the bulb 20.

The order of assembly of the bulb 20, the holder 50B (the second holder 60) and the bulb insertion attachment hole 13 is optional. The bulb 20 may be fixed to the holder 50B (the second holder 60) and may be then assembled into the bulb insertion attachment hole 13, or the holder 50B (the second holder 60) may be assembled into the bulb insertion attachment hole 13 and the bulb 20 may be then fixed to the holder 50B (the second holder 60).

Others are the same as those of the infrared irradiation lamp 10F according to the sixth embodiment (see FIGS. 10 and 11) and have the same reference numerals, and repetitive description thereof will be thereby omitted.

Figure 13:
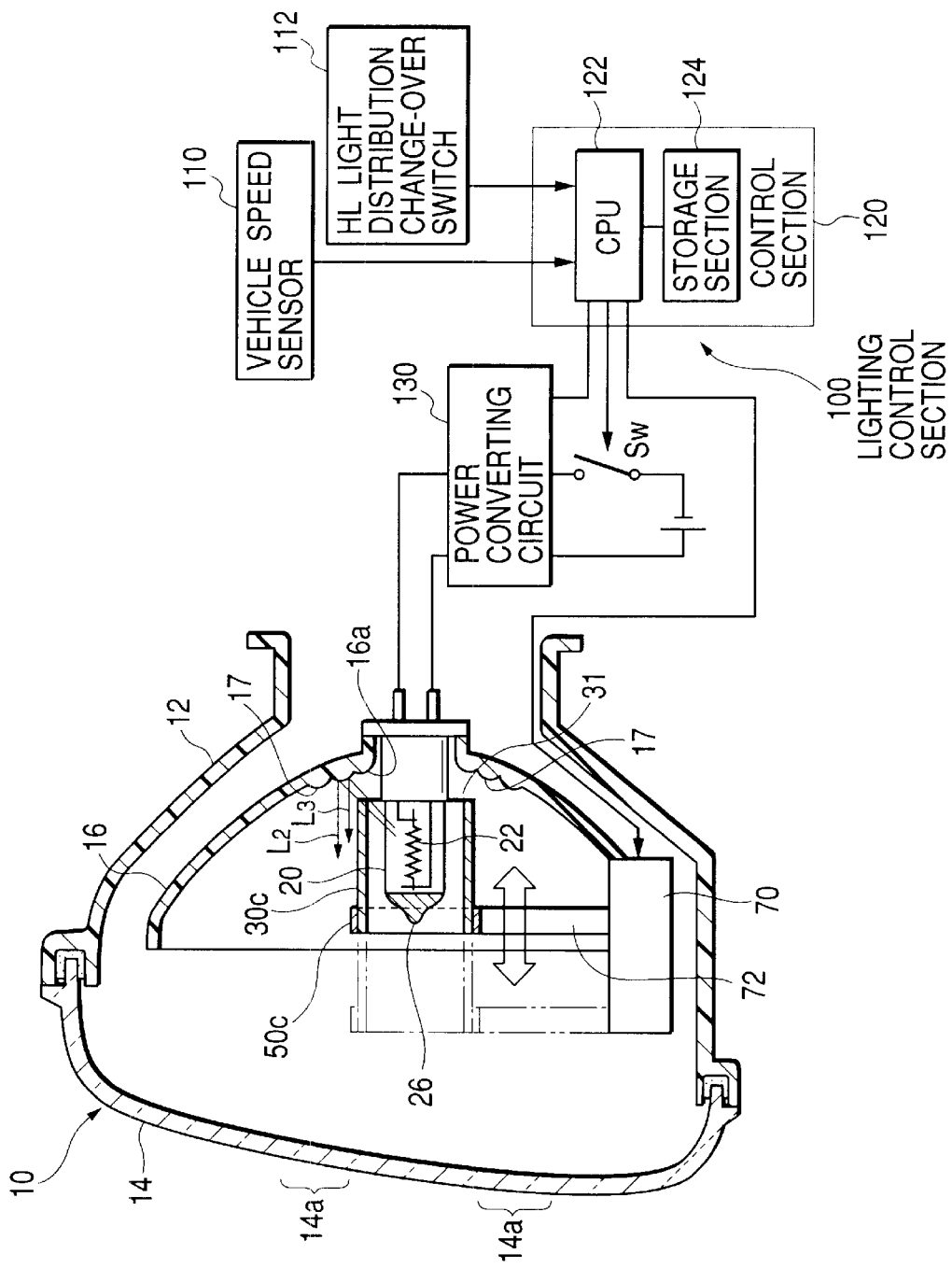
FIG. 13 is a longitudinal sectional view showing an infrared irradiation lamp according to an eighth embodiment of the invention.

FIG. 13 is a longitudinal sectional view showing an infrared irradiation lamp according to an eighth embodiment of the invention.

An infrared irradiation lamp 10H according to the embodiment features that a globe 30C for infrared light formation is fixed to a slider 72 of a longitudinally slidable actuator 70 through an annular holder 50C and also functions as a lamp for main (beam formation) of a headlamp. The basic structure of the infrared irradiation lamp 10H is the same as the structures in the first embodiment (see FIGS. 3 and 4) and the sixth embodiment (see FIG. 10) and the same portions have the same reference numerals, and repetitive description thereof will be thereby omitted.

More specifically, if the globe 30C for infrared light formation which covers a bulb 20 is placed in a position shown in a solid line of FIG. 13, a light (white light) emitted from the bulb 20 is transmitted through the globe 30C and is changed into an infrared light, and the infrared light is reflected by the reflector 16 and is emitted from a front lens 14 so that the globe 30C functions as an infrared irradiation lamp. The red light component of a visible light which cannot completely be cut by the globe 30C is diffused and reflected by a peripheral region 16a of a light source in the reflector 16 (a fish-eye step 17) and is thus emitted from the front lens 14. Furthermore, the light of the light source is guided from a clearance 31 provided between the globe 30C and the reflector 16 to the peripheral region 16a of the light source in the reflector 16, and the light (white light) of the light source is diffused and reflected by the fish-eye step 17 and is thus emitted from the front lens 14. Accordingly, the luminous flux density of the red light component distributed forward from a region 14a of the central part of the front lens 14 is reduced so that the lamp is not seen to emit a red light.

Furthermore, a light shielding portion 26 referred to as a black top is provided in the tip portion of the glass bulb of the bulb 20 and serves to shield a direct light (a visible light and an infrared light) transmitted forward from the bulb 20, thereby impeding the generation of a glare light.

On the other hand, when the globe 30C for infrared light formation is moved to a position shown in a virtual line of FIG. 13 to release the periphery of the bulb 20 by the actuator 70, a light (white light) emitted from the bulb 20 is not transmitted through the globe 30C but is guided to the whole reflector 16 so that a main beam is formed.

Moreover, in the case in which the lamp 10H is to be used as an infrared irradiation lamp by a lighting control circuit 100 comprising a vehicle speed sensor 110, a headlamp light distribution change-over switch 112 and a control portion 120 having a CPU 122 and a storage portion 124, the lamp 10H is turned on during only a running operation and is automatically put out at a predetermined speed V0 or less at which a vehicle speed V approximates to zero at time of stoppage. Furthermore, in the case in which the light distributed from a headlamp is to be changed into a main beam, the globe 30C is moved forward so that only a visible light is distributed.

More specifically, a vehicle speed condition for outputting a stop signal to stop the light emission of the bulb 20 is previously input and set to the storage portion 124 of the control portion 120. When the CPU 122 decides that the vehicle speed V is set to be the predetermined speed V0 or less which approximates to zero in response to an output sent from the vehicle speed sensor 110, it outputs a stop signal for turning OFF a bulb light-up switch Sw. Consequently, the bulb light-up switch Sw is turned OFF so that the supply of a current to the bulb 20 is stopped and the bulb 20 (the lamp 10H) is thereby put out.

Moreover, the reference numeral 130 denotes a power converting circuit constituted by a chopper circuit provided in a feeding path to the bulb 20 which is not operated but exactly supplies the power of a battery to the bulb when it is used as the lamp for main beam formation, and is operated (causes the supplied power to take the shape of a rectangular wave) to convert the power to a predetermined proper power (for example, 12V) to be supplied to the bulb 20 when it is used as the infrared irradiation lamp and the power supplied from the battery exceeds a predetermined value (for example, 13V). Consequently, it is possible to avoid various problems caused by the inside of the globe 30C filled with heat to increase the temperature of the bulb 20.

Figure 14:
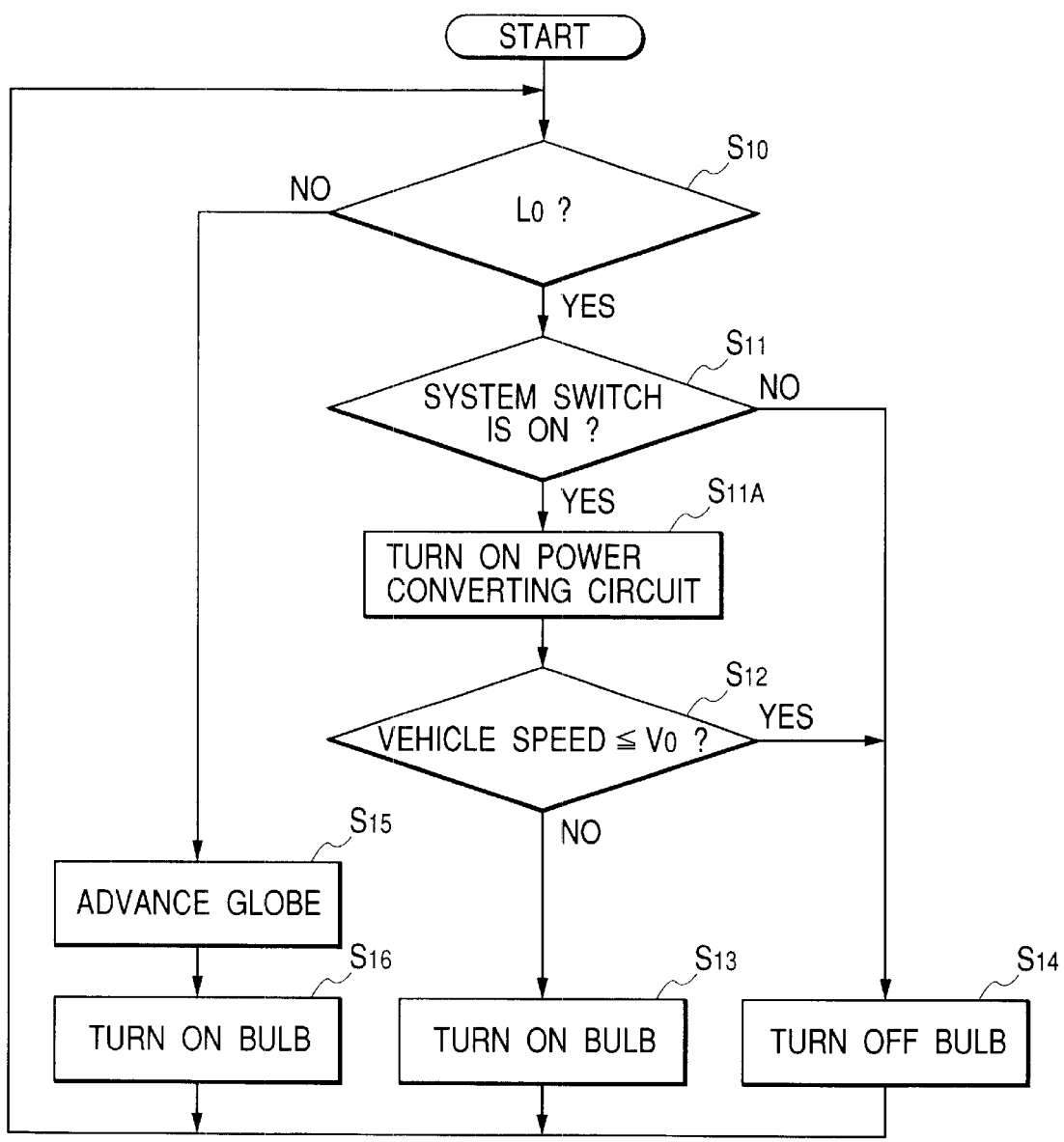
FIG. 14 is a flow chart showing a processing flow of a CPU in a control portion for controlling the light-up of the infrared irradiation lamp.

FIG. 14 shows a processing flow of the control portion 120 (CPU 122) of the lighting control circuit 100. This routine is started on the premise that a headlamp (a low beam or a main beam) is set in a light-up state.

First of all, at a step S10, it is decided whether or not the light-up of the headlamp is the low beam based on a signal sent from the light distribution change-over switch 112. If the decision is YES (low beam light-up) at the step S10, the process proceeds to a step S11 in which it is decided whether or not a switch for operating a main beam night forward field-of-view detecting system is ON. Although the system operating switch is pressed as a manual switch when a driver drives while watching an image on a head up display 6, it may be constituted to be turned ON interlockingly with the light-up of the low beam.

Then, if the decision is YES at the step S11 (the night forward field-of-view detecting system operating switch is ON), a signal for setting the power converting circuit 130 into an operation state is output at a step S11A. At a step S12, then, it is decided whether or not a vehicle speed V is equal to or lower than a predetermined value (V0) which approximates to zero based on the output of the vehicle speed sensor 110. If the decision is NO (V>V0) at the step S12, the process proceeds to a step S13 in which an output is sent to turn ON the bulb 20, and then returns to the step S10.

On the other hand, if the decision is NO (main beam light-up) at the step S10, the process proceeds to a step S15 in which an actuator driving signal is output to move the globe 30 forward. At a step S16, an output is sent to light up the bulb 20. Consequently, a main beam is obtained by only a visible light.

Moreover, if the decision is NO at the step S11 (the night forward field-of-view detecting system operating switch is not ON) or the decision is YES at the step S12 (V≦V0), an output is sent to put out the lighted bulb 20 (the infrared irradiation lamp 10) at a step S14 and the process then returns to the step S10.

While the fish-eye steps 17 and 15 are illustrated as diffusion steps for diffusing a red light component which are to be provided in the reflector 16 and the front lens 14 in the embodiment, it is also possible to provide a cylindrical step having the function of diffusing and reflecting a light or diffusing and transmitting the light or another step.

As is apparent from the description, according to the first aspect of the invention, the luminous flux density of a red light component emitted from the vicinity of the central part of the front lens is low. Therefore, even if the infrared irradiation lamp is turned on, a red color is not remarkable and the lamp is not seen to be red differently from the conventional art. Therefore, there is no possibility that a driver and a pedestrian might erroneously recognize the light-up of the infrared irradiation lamp as the light-up of a tail lamp or a stop lamp. Correspondingly, safety for running can be maintained.

According to the second aspect of the invention, the luminous flux density of the red light component emitted from the vicinity of the central part of the front lens is reduced by the light diffusing function of the diffusion step in the reflector and/or the diffusion step in the front lens. In addition, a white light component emitted from the vicinity of the central part of the front lens is increased. Consequently, the emission of the red light of the lamp is further diluted so that there is no possibility that the infrared irradiation lamp might be erroneously recognized as another lamp.

According to the third aspect of the invention, a glare light is not generated during the light-up of the lamp. Therefore, a car running in the opposite direction or a pedestrian is not bothered.

Moreover, the light emitted from the vicinity of the central part of the front lens is obtained by adding a diffused light of the light (white light) of the light source reflected by the reflecting surface on the back of the shielding shade to the red light component diffused by the diffusion step of the reflector and/or the diffusion step of the front lens. Consequently, the red light emitted from the lamp is further diluted so that there is no possibility that the infrared irradiation lamp might be recognized as another lamp.

What is claimed is:

1. An infrared irradiation lamp for an automobile comprising a lamp housing formed by a lamp body and a front lens, a reflector provided in the lamp body, a light source provided ahead of the reflector in the lamp housing, and a cylindrical globe for infrared light formation which is provided to cover the light source and serves to shield a visible light and to transmit only an infrared light, wherein a diffusion step is provided on a part of the reflector with being in a peripheral region of the light source, and/or on another part of the front lens with being corresponding to the peripheral region of the light source.

2. The infrared irradiation lamp for an automobile according to claim 1, wherein the globe for infrared light formation has a rear end thereof provided apart from the reflector, and a light of the light source is directly guided from a clearance provided between the reflector and the rear end of the globe for infrared light formation to the peripheral region of the light source in the reflector.

3. The infrared irradiation lamp for an automobile according to claim 1, wherein a shielding shade for shielding the light of the light source emitted from an opening on a front end side of the globe is provided ahead of the globe for infrared light formation, and a reflecting surface for reflecting the light of the light source and for guiding the reflected light to the peripheral region of the light source in the reflector is provided on a back side of the shielding shade.

4. The infrared irradiation lamp for an automobile according to claim 2, wherein a shielding shade for shielding the light of the light source emitted from an opening on a front end side of the globe is provided ahead of the globe for infrared light formation, and a reflecting surface for reflecting the light of the light source and for guiding the reflected light to the peripheral region of the light source in the reflector is provided on a back side of the shielding shade.

5. The infrared irradiation lamp for an automobile according to claim 1, wherein the diffusion step is formed in a ring-shape so as to surround the light source.

* * * * *